(12) United States Patent
Girgenrath

(10) Patent No.: US 8,714,213 B2
(45) Date of Patent: May 6, 2014

(54) TANK FILLER NECK

(75) Inventor: Martin Girgenrath, St. Augustin (DE)

(73) Assignee: Ford Global Technologies, LLC, Dearborn, MI (US)

( * ) Notice: Subject to any disclaimer, the term of this patent is extended or adjusted under 35 U.S.C. 154(b) by 637 days.

(21) Appl. No.: 13/007,313

(22) Filed: Jan. 14, 2011

(65) Prior Publication Data

US 2011/0180176 A1 Jul. 28, 2011

(30) Foreign Application Priority Data

Jan. 27, 2010 (DE) .......................... 10 2010 001 272

(51) Int. Cl.
*B60K 15/04* (2006.01)

(52) U.S. Cl.
USPC .......................................... 141/350; 220/86.2

(58) Field of Classification Search
USPC .................... 141/348–350; 220/86.2–86.3
See application file for complete search history.

(56) References Cited

U.S. PATENT DOCUMENTS

| | | | | |
|---|---|---|---|---|
| 4,747,508 A | * | 5/1988 | Sherwood | 220/86.2 |
| 4,917,157 A | * | 4/1990 | Gifford et al. | 141/59 |
| 5,042,678 A | * | 8/1991 | Munguia | 220/254.9 |
| 5,439,129 A | * | 8/1995 | Buechler | 220/86.2 |
| 5,529,201 A | * | 6/1996 | Tallent et al. | 220/298 |
| 5,595,222 A | * | 1/1997 | Thompson | 141/312 |
| 5,732,841 A | * | 3/1998 | Jocic et al. | 220/203.24 |
| 5,921,297 A | * | 7/1999 | Kremer et al. | 141/383 |
| 5,924,590 A | * | 7/1999 | Jocic et al. | 220/203.24 |
| 5,960,839 A | * | 10/1999 | Armesto et al. | 141/304 |
| RE37,776 E | * | 7/2002 | Foltz | 220/86.2 |
| 6,415,827 B1 | * | 7/2002 | Harris et al. | 141/348 |
| 6,681,817 B2 | * | 1/2004 | Hagano et al. | 141/348 |
| 6,945,290 B1 | | 9/2005 | Benjey et al. | |
| 7,048,019 B2 | * | 5/2006 | Pacitto et al. | 141/286 |
| 7,096,899 B2 | * | 8/2006 | Vetter et al. | 141/350 |
| 7,302,977 B2 | * | 12/2007 | King et al. | 141/367 |
| 7,484,525 B2 | * | 2/2009 | Jahnke | 137/467 |
| 7,617,851 B2 | * | 11/2009 | Barnes et al. | 141/286 |
| 7,721,775 B2 | * | 5/2010 | Pozgainer | 141/350 |
| 7,997,306 B2 | * | 8/2011 | Kobayashi et al. | 141/346 |
| 8,167,010 B2 | * | 5/2012 | Yoshida | 141/350 |
| 2002/0092581 A1 | * | 7/2002 | Hagano et al. | 141/348 |
| 2006/0096662 A1 | * | 5/2006 | King et al. | 141/367 |

FOREIGN PATENT DOCUMENTS

| | | |
|---|---|---|
| DE | 20309799 U1 | 8/2004 |
| DE | 10304556 A1 | 9/2004 |
| DE | 202005008327 U1 | 10/2006 |
| DE | 202006006201 U1 | 9/2007 |
| DE | 102007003516 A1 | 10/2007 |

* cited by examiner

*Primary Examiner* — Gregory Huson
*Assistant Examiner* — Nicolas A Arnett
(74) *Attorney, Agent, or Firm* — Julia Voutyras; Alleman Hall McCoy Russell & Tuttle LLP

(57) ABSTRACT

This disclosure relates to a tank filler neck which comprises a housing, in which at least one flow aid and a head part are arranged. The flow aid and the head part, which may be designed with a screw thread, are connected to form an insert, which by insertion in the housing can be connected thereto, a flap comprising a grounding lug being connectable to the head part.

17 Claims, 6 Drawing Sheets

TANK FILLER NECK

CROSS REFERENCE TO RELATED APPLICATIONS

This application claims priority to German Patent Application 102010001272.6, filed Jan. 27, 2010 and entitled "Tank Filler Neck", the entirety of which is hereby incorporated by reference herein for all purposes.

TECHNICAL FIELD

This application relates to the field of motor-vehicle engineering, and more particularly to a tank filler neck that comprises a housing in which at least one flow aid and a head part are arranged.

BACKGROUND AND SUMMARY

DE 20 2005 008 327 U1 discloses an end for a tank filler neck of a fuel tank of a motor vehicle and for the seating of a filler inlet cap, comprising a neck tube, a metal end piece, which is arranged on the neck tube so as to form at least part of a neck end area of the filler neck, and a screw thread, which is arranged internally in the neck tube. The screw thread is formed by a threaded element, which is a separate component from the end piece.

DE 203 09 799 U1 discloses a capless filler neck of a fuel tank having a filler neck, which comprises an upper collector, which is embodied as a hollow chamber enclosed by a wall, and an upper neck edge passing through the wall of the collector to receive a fuel filling nozzle, the collector being connected to the fuel tank, and an upper closure, opened by insertion of the fuel filling nozzle, for closing the upper neck edge, which closure is automatically held in the sealing position by return componentry when the fuel filling nozzle is not inserted. The collector comprises a lower wall having a lower filler inlet, which connects the interior of the collector to a lower neck part connected to the fuel tank. The lower filler inlet can be closed by a lower closure, which can be opened by insertion of the fuel filling nozzle and is automatically held in the sealing position by a second return componentry when a fuel filling nozzle is not inserted.

Filler necks which can either be closed by a filler inlet cap, that is to say which are designed as a cap system, or which as a capless system can be adequately closed without the use of a filler inlet cap when no fuel filling nozzle is being inserted into the filler neck, are therefore known in the state of the art.

In practice the two systems have each proved suitable for their intended purpose, either the cap system or the capless system being used in individual markets according to international market requirements. However, in some countries non-standardized fuel filling nozzles are used, so that the capless system in particular can be used only to a limited extent. If a motor vehicle manufacturer then opts for the capless system, for example, when equipping his motor vehicles, considerable marketing difficulties could then occur, since perhaps only a cap system can be used in the particular market. The two systems are constructed differently from one another or are designed with individual refinements, so that a change from the capless system to a cap system and vice-versa holds considerable difficulties.

Proceeding from this, the inventor herein have recognized certain advantages of providing a filler neck of the aforementioned type as a system of modular construction, that can be cost-effectively manufactured and individually adapted either as a cap system or as a capless system.

Accordingly, one embodiment includes a filler neck having a housing and an insert coupled in the housing. The insert includes at least one flow aid and a head part having a screw thread. The flow aid is connectable to the head part. In this embodiment, the insert further includes a flap with a grounding lug connectable to the head part.

This disclosure provides a modular construction of capless and capped filler necks or filler pipe systems, in which the filler pipe, proceeding from a filler pipe or from its filler pipe head, can be used without modification for capless systems. The modular insert assembled according to market requirements is simply inserted in this pipe. If a motor vehicle is therefore produced for a consumer market in which the fuel filling nozzle is not standardized, for example, the capless system originally provided can easily be changed to a cap system, in which an adapted head part is connected or locked to the flow aid and introduced into the housing as an insert.

In order to be able to lock the flow aid to the head element, the flow aid on its outer circumference suitably comprises catches, which engage in latching eyelets arranged on the head part. The latching eyelets are preferably arranged on an insertion side of the head part. It is advantageous if more than one, for example two latching eyelets are provided, which are arranged circumferentially opposite one another. A number of catches corresponding to the number of latching eyelets is provided on the flow aid.

The head part comprises the insertion side and an opposing outer side, and is preferably designed with a cylindrical wall. In order to be able to connect or lock the insert to the housing, detent catches, which can be locked to detent recesses arranged on the housing, are advantageously arranged on the outer circumference of the wall. The detent catches are arranged to match the detent recesses on the wall, more than one, for example two detent catches and two detent recesses preferably being provided, which as previously mentioned are arranged circumferentially opposite one another.

It is advantageous if the head part on its outer circumference, that is to say in the wall, comprises a circumferential groove, in which a sealing element can be arranged. The sealing element is preferably designed as an O-ring seal. In a further advantageous development the sealing element comprises a circumferential, V-shaped, preferably a truncated cone-shaped cut-out on its outer circumference, so as to form two sealing lips arranged at an interval from one another. The sealing element bears with its outer circumference or with its sealing lips to form a medium-tight seal against an inner circumference of the housing when the insert, that is to say the unit assembled from the separate head part and the separate flow aid, is inserted in the housing and is locked thereto. The sealing element bears on the housing and prevents an unwanted outflow of fuel and fuel gases into the surroundings.

In a further advantageous development, the head part, on its insertion area or its outer circumference, may comprise a stepped bearing contact area, which is designed to correspond to (e.g., geometrically complement) an abutting area of the housing. Viewed in the vertical direction of the head part, the bearing contact area is preferably located between the detent catches and the circumferential groove. In its interior the insertion area comprises a seating area for the seating of the flow aid or for the seating of its head side.

In its interior, the head part comprises a filler inlet arranged eccentrically in relation to the center point for the introduction of a fuel filling nozzle. The filler inlet is surrounded by a separating element, which is connected to the inner circumference or the inside wall of the head part and extends radially into the interior of the head part. At least one circular segmental venting slit, which as a recess in the separating element adjoins the inside wall of the head part, may be incorporated in the separating element. It is advantageous if two venting slits, which are arranged circumferentially opposite one another, are provided.

A flap mounting for the flap is also suitably arranged on the separating element. In a preferred development the flap mounting is arranged between the two venting slits in a mounting area of the separating element and in a preferred development comprises a latching slot, with which a latching fillet of the flap can interact, so that the flap is securely locked inside the head part. The design and operating principle of the flap or the spring flap will be examined in more detail below.

For the seating of a filler inlet cap it is advantageous for the purposes of this disclosure if the head part, on its inner circumference or on its inside wall, comprises a screw thread, which in a preferred development and when viewed in a vertical direction comprises an upper thread and a lower thread. In order to achieve an automatic ejection of the filler inlet cap from its closed position into a removal position, the lower thread suitably comprises two portions of different pitch, the two portions preferably being arranged at an obtuse angle to one another. For the purposes of this disclosure an obtuse angle is an angle which is greater than 90° but less than 180°, the two portions, viewed in longitudinal section, virtually being arranged almost in a z-shape relative to one another. This indicates that, viewed in a vertical direction, one of the portions, relative to the other portion, rises above the other portion. If the filler inlet cap, which naturally comprises a corresponding, mating thread, is turned, preferably manually, out of its closed position into the removal position, the lower thread thus causes the filler inlet cap to spring out of the head part.

The flow aid is suitably of funnel-like design, and tapers from its head side towards an outflow side. The flow aid can be inserted by its head side into the head part or its seating area, so that the head side is gripped by the insertion side of the head part, and the catches on the flow aid can engage in the latching eyelets of the head part.

In the fitted state the flap is arranged on the head part in such a way that its grounding lug protrudes outwards beyond the actual head part. It is therefore advantageous if the flow aid comprises a cut-out on its head side, so as to allow the grounding lug to protrude, so that the latter can bear against the inside wall of the housing, when the insert, that is to say the unit assembled from the separate head part and the separate flow aid, is inserted into the housing and is locked to the latter. In a preferred development the cut-out may be of circular segmental design, so that its zenith is oriented towards the outflow side.

In a suitable embodiment the flow aid on its outer circumference may comprise guide elements, which in a preferred development are virtually of a fin-like design and protrude from the flow aid.

In a suitable embodiment the flap is integrally formed with a closure element, a spring fillet arranged thereon and the grounding lug located on the spring fillet. Located on the spring fillet is the latching fillet, which can be brought into latching engagement with the latching slot in the separating element. In a closed position the flap closes the closure element of the filler inlet, and is deflected when a fuel filling nozzle is introduced. When the fuel filling nozzle is removed from the filler inlet, the closure element is returned to its closed position under spring force.

The spring fillet comprises more than one, and in a preferred embodiment four spring portions. A first spring portion is bent out of the plane of the closure element, and merges into a second spring portion, which is doubled back towards the closure element plane, but protrudes beyond this. The second spring portion merges into a third spring portion, which is doubled back from the former towards the closure element plane. A transition between the second spring portion and the third spring portion is of rounded design, the third spring portion having a smaller axial extent than the second spring portion. The third spring portion merges into a fourth spring portion, which is arranged running virtually parallel to the closure element plane. The grounding lug adjoins the fourth spring portion. The latching fillet is located at the transition between the second and third spring portions.

The grounding lug is of virtually U-shaped design with two U-legs and a base web. With its connecting leg the grounding lug is located on the fourth spring portion of the spring fillet, the connecting leg merging into the base web. The base web merges into a bearing contact leg, on which a curvature is sited. The curvature is formed as an elevation or dip in relation to the base web. The bearing contact leg has a smaller axial extent than the connecting leg. The bearing contact leg or the elevation sited thereon serves to produce a bearing contact with the housing when the insert, that is to say the unit assembled from the separate head part and the separate flow aid, is inserted in the housing and locked to this.

The insert can thus be inserted into the filler neck, and into the filler pipe head. A filler inlet cap can be screwed to the head part. The modularly assembled system can thus be readily inserted into the filler neck to suit the respective market requirement of the relevant market. It is therefore feasible to modularly construct a cap system from the capless system. This is possible since advantageously the interfaces of the cap system have been correspondingly adapted to the configuration of the filler pipe, which is used for a capless system. Naturally a capless system can still also be inserted into the filler pipe or the filler pipe head, since both systems now have a uniform interface to the filler pipe head. A facility for individual adaptation to market requirements is thus achieved.

The summary above is provided to introduce a selected part of this disclosure in simplified form, not to identify key or essential features. The claimed subject matter, defined by the claims, is limited neither to the content of this summary nor to implementations that address problems or disadvantages noted herein.

BRIEF DESCRIPTION OF THE DRAWINGS

This disclosure will be better understood from reading the detailed description with reference to the attached drawing figures, wherein.

DETAILED DESCRIPTION

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree.

Figure 1:
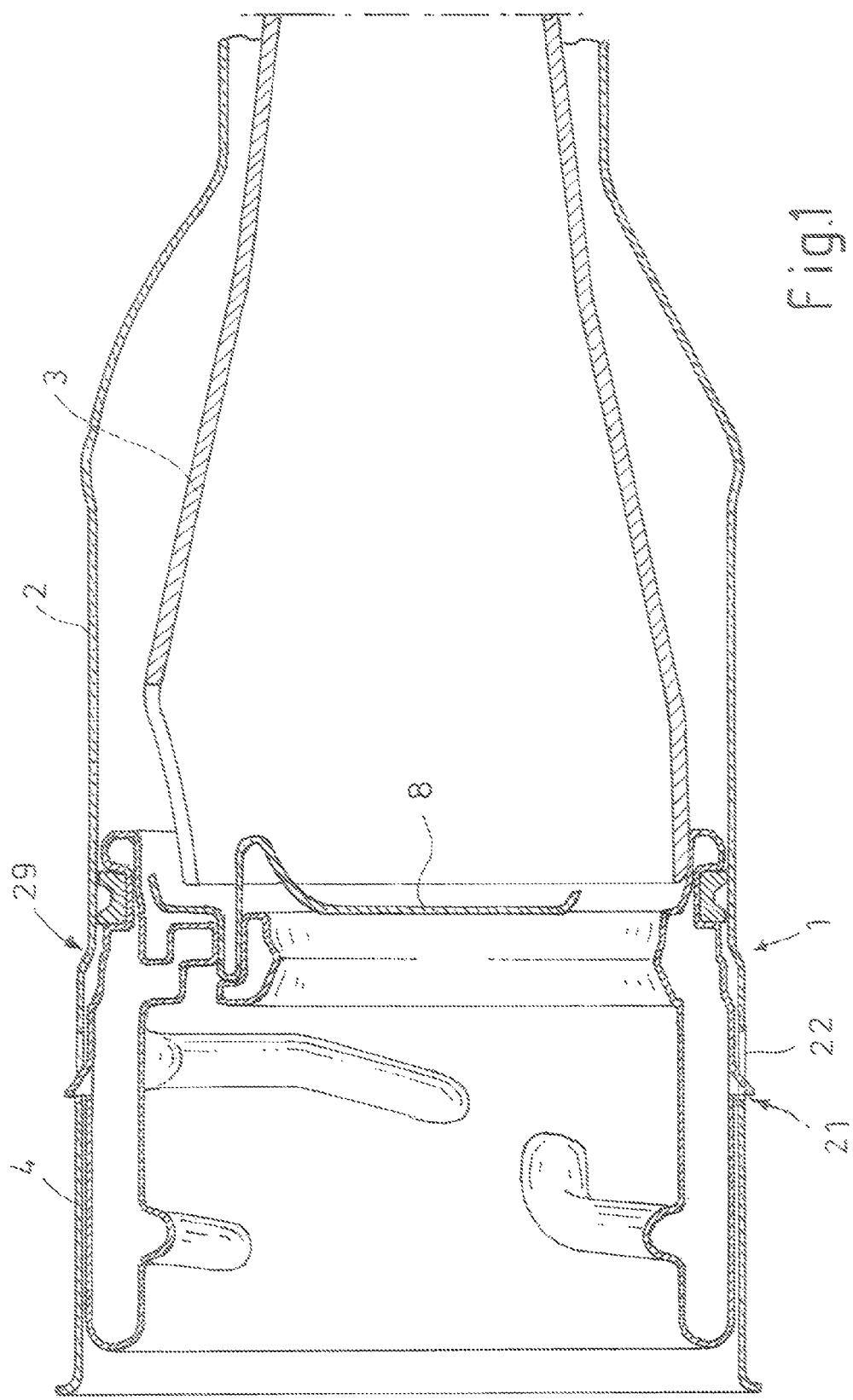
FIG. 1 shows a longitudinal section through a filler neck, in accordance with an embodiment of this disclosure.

FIG. 1 shows a longitudinal section through a tank filler neck 1 or a filler pipe head 1. A fuel tank of a motor vehicle can be filled with suitable fuels via the tank filler neck 1. A connection of the tank filler neck 1 to the fuel tank and corresponding venting lines are not shown in FIG. 1.

The tank filler neck 1 comprises a housing 2, in which at least one flow aid 3 and a head part 4 are arranged. The head part 4 can also be referred to as an adapter 4.

Figure 2:
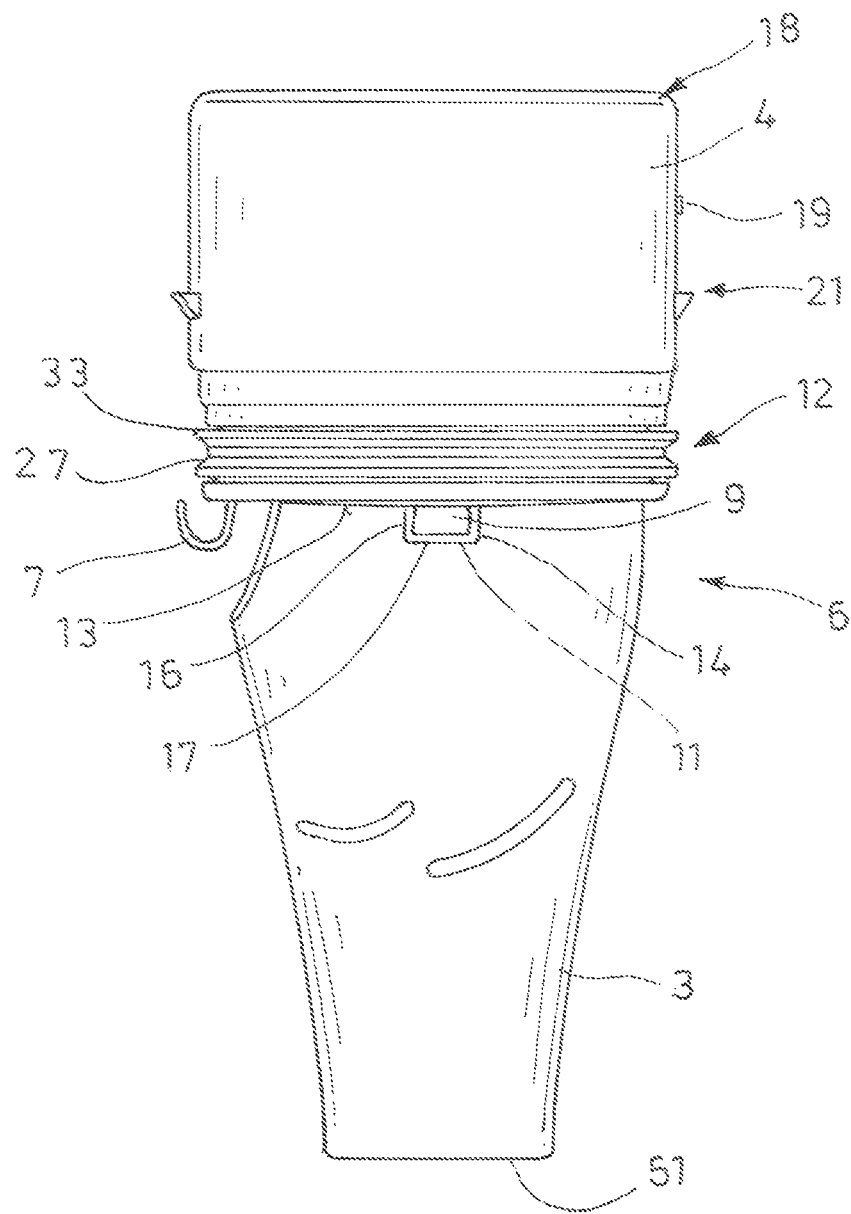
FIG. 2 shows a perspective view of an insert, in accordance with an embodiment of this disclosure.

The flow aid 3 and the head part 4 are advantageously connected or locked to an insert 6 (FIG. 2). The insert 6 assembled from the separate flow aid 3 and the separate head part 4 can be inserted or lockably inserted in the housing 2. A flap 8 comprising a grounding lug 7 is lockably arranged on the head part 4.

FIG. 2 shows the insert 6 as a detail, the flow aid 3 with catches 9 arranged thereon engaging in latching eyelets 11 arranged on the head part 4. Owing to the chosen perspective only one catch 9 and one latching eyelet 11 can be seen in FIG. 2. Further correspondingly designed interlocking elements 9 and 11 are arranged diametrically opposite the visible interlocking elements 9 and 11.

The respective latching eyelet 11 is arranged on an insertion side 12 or on its insertion edge 13, and is of a substantially U-shaped design with two U-legs 14, 16 and a base web 17. The legs 14 and 16 are connected to the base web 17 on the one hand and to the insertion edge 13 on the other, thereby forming a peripherally closed latching eyelet 11.

Opposite the insertion side 12 the head part 4 has an outer side 18, between which a cylindrical wall 19 is located. Arranged on the outer circumference of the wall 19 are detent catches 21, which for locking interact with correspondingly formed detent recesses 22 on the housing 2 (FIG. 1). By way of example FIG. 2 shows two detent catches 21, which are arranged diametrically opposite on the outer circumference of the housing 2.

Viewed in section, the detent catches 21 are triangular with a bearing contact face 23 oriented towards the outside 18. The bearing contact face 23 projects perpendicularly from the outer circumference of the wall 19. A slide face 24 extends from the free end of the bearing contact face 23 inclined towards the outer circumference of the housing 2 and the insertion side 12.

Figure 3:
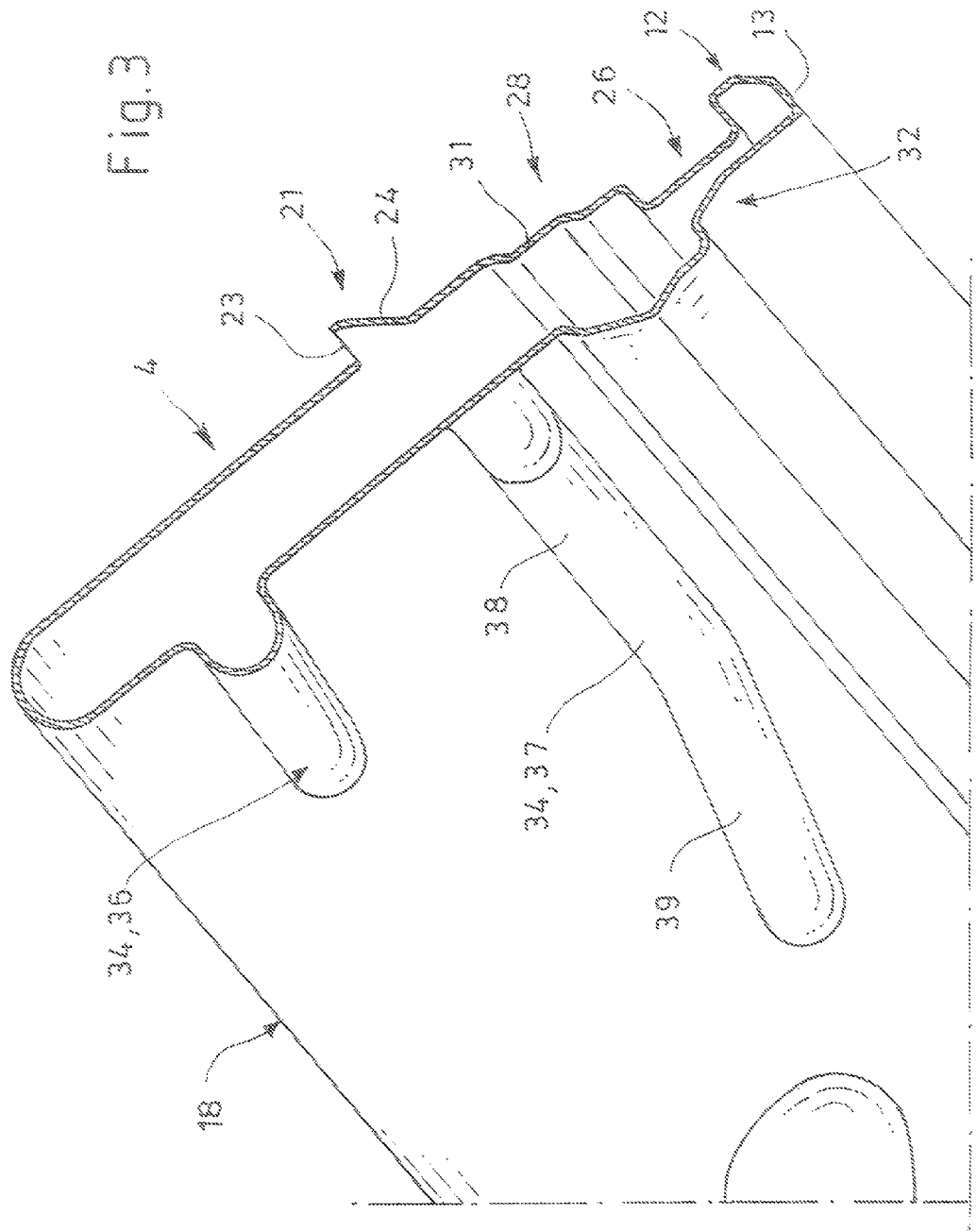
FIG. 3 shows a longitudinal section through a head part, in accordance with an embodiment of this disclosure.

In FIG. 3 the head part 4 is represented as a detail in longitudinal section. In the wall 19 the head part 4 has a circumferential groove 26, in which a sealing element 27 (FIG. 2) is seated. An insertion area 28 is located on the insertion side 12. Externally the insertion area 28 comprises a bearing contact area 31 of preferably stepped design corresponding to a mating contact area 29 arranged on the housing 2. A seating area 32 for the seating of the flow aid 3 is arranged on the inside of the insertion area 28.

The sealing element 27 (FIG. 2) is embodied as an O-ring seal 27, which on its upper surface has a V-shaped or truncated cone-shaped cut-out, so as to form two sealing lips 33 arranged at an interval from one another A screw thread 34 comprising an upper thread 36 and a lower thread 37 is arranged in the interior of the head part 4. The lower thread 37 comprises two portions 38 and 39 of different pitch. A first portion 38 merges into a second design portion 39. The two portions 38 and 39 are arranged at an obtuse angle to one another. As can be seen from FIG. 3, the design portion 39 rises upward in relation to the first portion 38, that is to say towards the outside 18 of the head part 4. The screw thread 34 serves for the seating of a filler inlet cap (not shown), which has a corresponding, mating thread. In its closed position the filler inlet cap closes the tank filler neck 1. When the filler inlet cap is turned into its removal position, the design portion 39 of the lower thread 37 causes the filler inlet cap to spring out of the head part 4.

Figure 4:
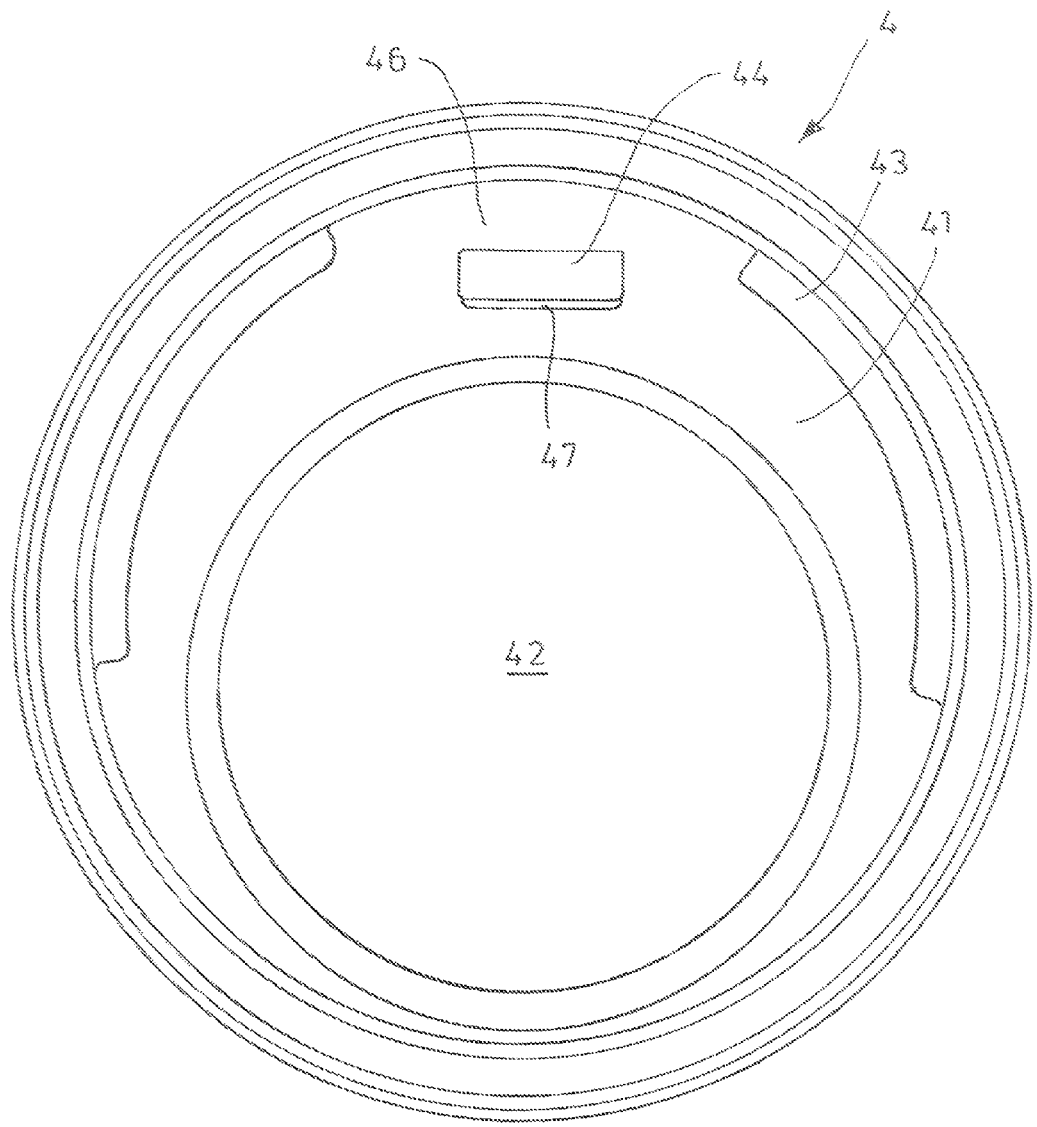
FIG. 4 shows a view of a head side into the head part in FIG. 3, in accordance with an embodiment of this disclosure.

In its interior, below the screw thread 34, the head part 4 comprises a separating element 41, in which an eccentrically introduced filler inlet 42 is arranged (FIG. 4). The separating element 41 is connected to the inside wall of the head part, preferably two venting slits 43 being made in the separating element 41 adjacent to the inside wall. The venting slits 43 are of circular segmental design.

Figure 6:
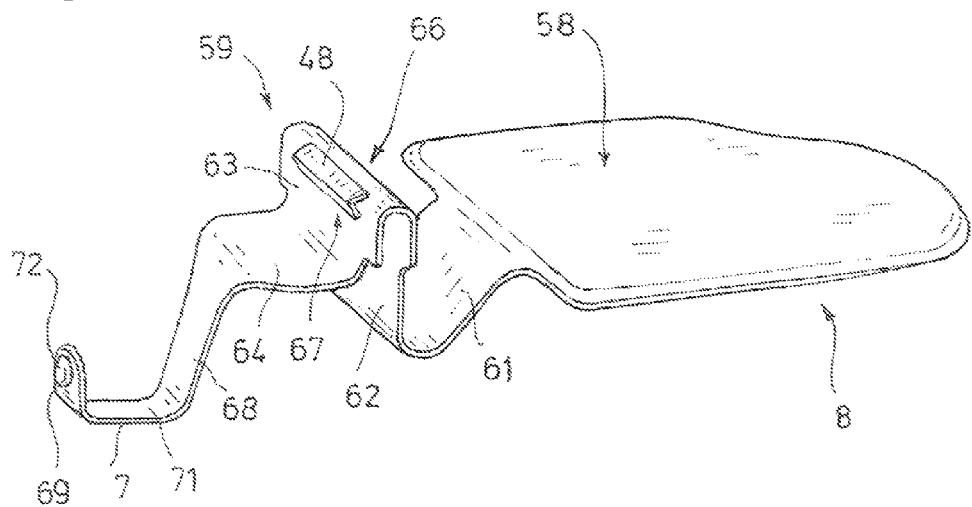
FIG. 6 shows a perspective view of a flap as a detail, in accordance with an embodiment of this disclosure.

A flap mounting 44, which is located in a mounting area 46 between the two venting slits shown, is arranged on the separating element 41. Sited on the mounting area 46 is a latching slot 47 for receiving a latching fillet 48, the latching fillet 48 being located on the flap 8 (FIG. 6), which will be examined in more detail below.

Figure 5:
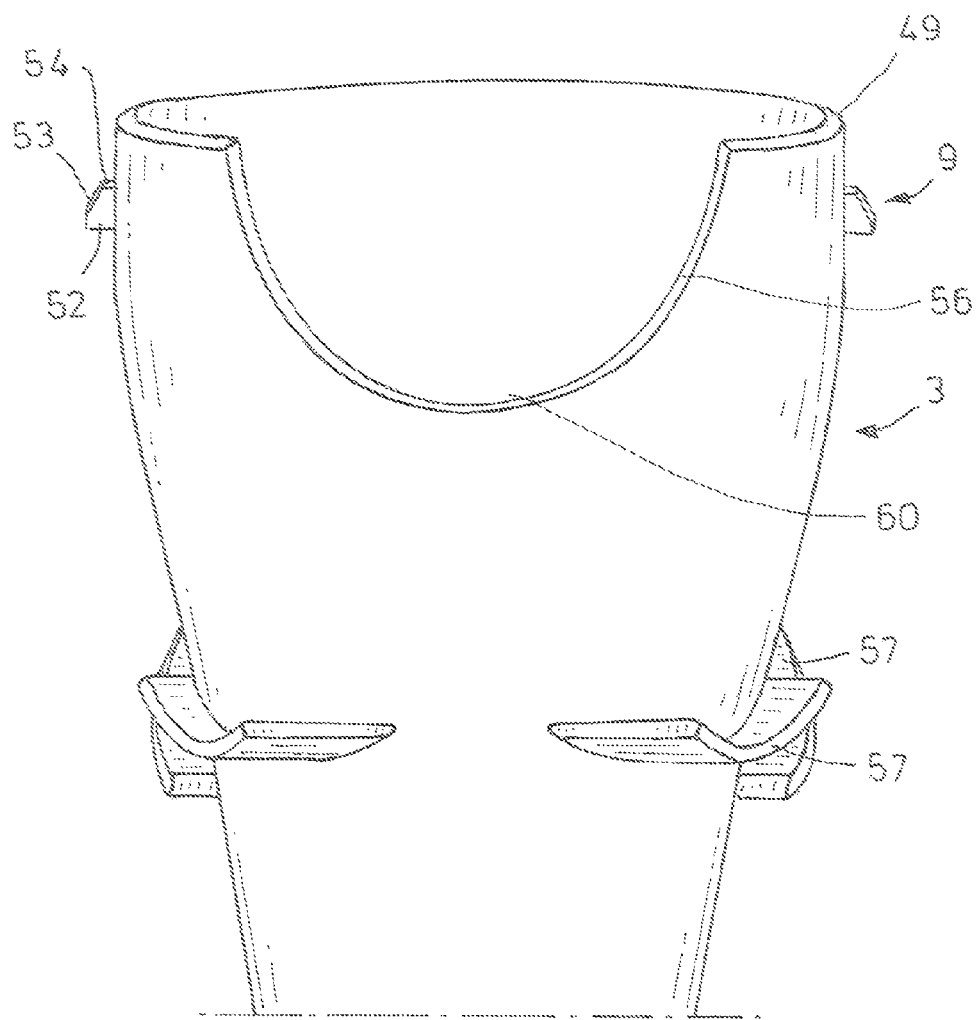
FIG. 5 shows part of a flow aid as a detail, in accordance with an embodiment of this disclosure.

The flow aid 3 is of funnel-like design (FIG. 5) and tapers from a head side 49 towards an outflow side 51 (FIG. 2). The flow aid 3 can be inserted by the head side 49 into the insertion area 28 or into the seating area 32, so that the head side 49 is gripped by the head part 4.

The catches 9 are of trapezoidal design, and have a detent face 52 oriented towards the outflow side 51, adjoining which face is a slide face 53, which extends at an inclined angle towards the head side 49 and merges into an upper side 54 running parallel to the detent face 52. The detent face 52 protrudes perpendicularly, for example, from the flow aid 3, and extends further than the upper side 54.

On its head side 49 the flow aid has a circular segmental cut-out 56, so that the grounding lug 7 of the flap 8 can be led out of the insert 6 (FIG. 2), and can enter into contact with the housing 2. The cut-out 56 is oriented with its rounding or with its zenith 60 towards the outflow side 51. Guide elements 57 are arranged externally on the flow aid 3.

The flap 8 (FIG. 6) is integrally formed with a closure element 58, a spring fillet 59 arranged thereon and with the grounding lug 7 arranged on the spring fillet 59. The flap 8 may be made from a special steel, for example. The housing 2 may be embodied as a metal housing. The head part 4 and the flow aid 3 may be made from a plastic, for example from an impact modified acetylate copolymer (impact modified POM).

The latching fillet 48 is arranged on the spring fillet 59. In a closed position the flap 8 or its closure element 58 closes the filler inlet 42 and is deflected when a fuel filling nozzle is introduced. The closure element 58 is returned to the closed position under spring force when the fuel filling nozzle is removed.

The spring fillet 59 comprises more than one, for example, four, spring portions 61 to 64. A first spring portion 61 is led or bent out of the plane of the closure element 59, and merges into a second spring portion 62 bent off from the former. The second spring portion 62 is doubled back towards the closure plane, and projects beyond this. The second spring portion 62 merges via a rounded transition 66 into the third spring portion 63, which is doubled back towards the closure element plane. The third spring portion 63 merges into the fourth spring portion 64, which running virtually parallel to the closure element plane is oriented away from the closure element 59.

The latching fillet 48, which is oriented with its free edge 67 inclined towards the fourth spring portion 64, is arranged at the rounded transition 66.

The grounding lug 7 is of virtually U-shaped design with two U-legs 68 and 69 and a base web 71. A connecting leg 68 adjoins the spring fillet 59 or a fourth spring portion 64 thereof and merges into the base web 71. Adjoining the base web 71 is a bearing contact leg 69, on which a curvature 72 is sited. The curvature 72 is formed as an elevation or dip in relation to the base web 71.

As can be seen from FIG. 2, the separate flow aid 3 can first be connected by way of the corresponding interlocking elements 9 and 11 to the head part 4, thereby forming the insert 6. Protruding from this is the grounding lug 7 of the flap 8. The flap 8 has previously been connected or locked to the head part 4 by way of the corresponding interlocking elements 47 and 48.

The insert 6 can thus be inserted into the housing 2 and connected or locked to the housing 2 by way of the corresponding interlocking elements 21 and 22.

The respective latching connections can be selected so that these are permanent, once the respective locking engagement has been established. However, the respective interlocking elements can naturally also be designed so as to provide releasable latching connections, as required.

Figure 7:
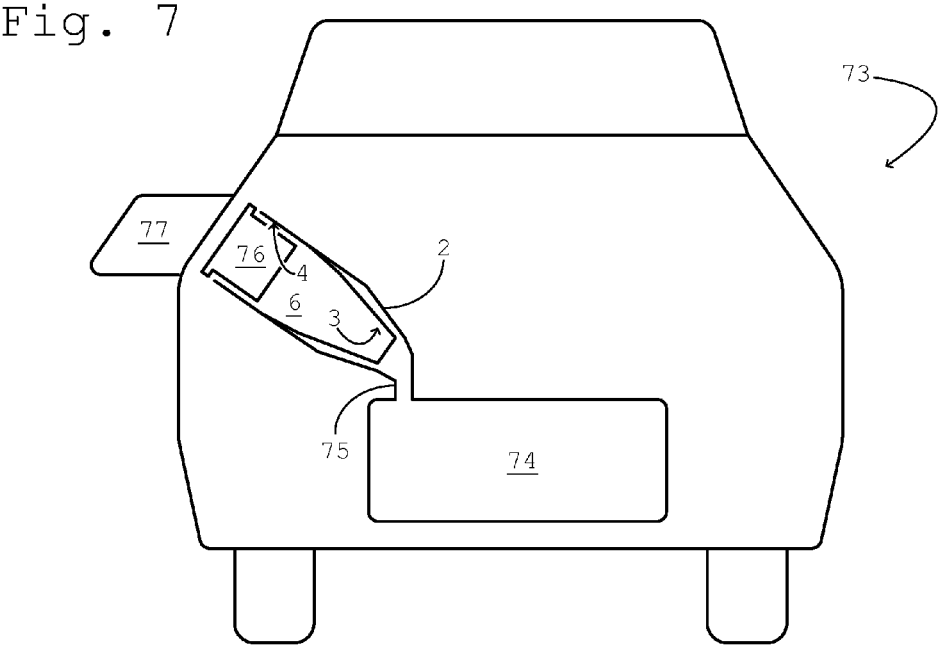
FIG. 7 schematically shows a motor vehicle having a tank filler neck, in accordance with an embodiment of this disclosure.

This disclosure basically provides a system of modular construction, which enables a motor vehicle manufacturer to respond to different market requirements without modifying his established series-production strategy when it comes to designing the filler neck as a cap system or as a capless system. This is because the proposed insert 6 can be used in a filler neck which is actually designed for a capless system. Accordingly, FIG. 7 schematically shows an example motor vehicle 73 with fuel tank 74. Through conduit 75, tank filler neck housing 2 is fluidically coupled to the fuel tank. Tank filler insert 6 is fixedly or releasably coupled within the tank filler neck housing. As described hereinabove, the lower portion of the tank filler insert comprises flow aid 3, and the upper portion comprises head part 4. In the illustrated embodiment, screw cap 76 is releasably coupled to the head part via a screw thread, as described above; in other embodiments the screw cap may be omitted. With or without the screw cap, the head part of the insert may be coupled in the motor vehicle beneath fuel door 77, shown open in FIG. 7.

Despite the respective adaptations of the head part 4 (the external geometry of which is adapted to the design of the filler pipe head 1), the flap 8 (the grounding lug is adapted to the design of the head part 4) and the flow aid 3, economic advantages accrue, since both systems (capless system and cap system) can be used in a filler pipe 1 or in its filler pipe head 1, so that the motor vehicle manufacturer can decide individually in the case of the particular motor vehicle to be manufactured for a specific market which system is fitted in the specific motor vehicle. Naturally both systems may be designed so as to prevent incorrect refueling with a wrong fuel (Misfueling Inhibitor MFI).

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A filler neck for a fuel tank, comprising:
a housing in the form of a pipe fluidically coupled to the fuel tank; and
insertable in and attachable to the housing, an insert including at least one flow aid and a head part, the flow aid being connectable to the head part and disposed within the housing, the head part configured to couple to the housing and including a screw thread configured to receive an inlet filler cap, the insert further including a flap with a grounding lug connectable to the head part.

2. The filler neck of claim 1 further comprising one or more latching connections with two or more interlocking elements.

3. The tank filler neck of claim 1, wherein the flow aid includes one or more catches configured to engage one or more complementary latching eyelets arranged on the head part.

4. The tank filler neck of claim 1, wherein the head part includes one or more detent catches configured to engage one or more complementary detent recesses arranged on the housing.

5. The filler neck of claim 1, wherein an insertion area is arranged on an insertion side of the head part, and wherein an exterior of the insertion area includes a bearing contact area configured to bear against a mating contact area of the housing, and a circumferential groove configured to seat a sealing element, and wherein an interior of the insertion area includes a seating area configured to seat the flow aid.

6. The filler neck of claim 1, wherein the head part comprises a filler inlet surrounded by a separating element, and wherein the separating element comprises at least one venting slit and a latching slot configured to seat the flap or a latching fillet.

7. The filler neck of claim 1, wherein the screw thread includes a lower thread having first and second portions of unequal pitch, and wherein the first and second portions intersect at an obtuse angle, such that a design portion rises upward towards an outer side of the head part.

8. The filler neck of claim 1, wherein the flow aid is funnel-shaped and comprises a cut-out arranged on its head side, and wherein the cut-out is configured to allow the grounding lug to be led out of the insert.

9. The filler neck of claim 1, wherein the flap is integrally formed from a closure element, an adjoining spring fillet, and an adjoining grounding lug, and wherein the spring fillet is formed from a plurality of spring portions, and wherein the grounding lug is U-shaped, comprising a curvature formed on a bearing contact leg thereof.

10. A method for adapting a capless tank filler neck of a motor vehicle to accept an inlet filler cap, the method comprising:
inserting an insert into a pipe fluidically coupled to a fuel tank of the motor vehicle, the pipe configured to be a housing for the insert, the insert including at least one flow aid, a head part, and a flap, the flow aid being connectable to the head part and disposed within the pipe, the head part configured to couple into the pipe and including a screw thread configured to receive an inlet filler cap, the flap having a grounding lug connectable to the head part, the head part having a screw thread configured to receive the inlet filler cap; and
coupling the insert into the pipe.

11. The method of claim 10 further comprising releasably attaching a filler inlet cap to the head part of the insert, wherein the tank filler neck comprises a capless pipe head before said adapting.

12. An insert to be received in a housing of a tank filler neck of a motor vehicle, the insert comprising:
a head part having two or more latching connections, a screw thread configured to receive a fuel filler cap, and one or more detent catches configured to engage one or more corresponding, complementary detent recesses arranged on an inside surface of the housing;

a flow aid connectable to the head part, the flow aid having two or more latching connections complementary to the two or more latching connections of the head part; and a flap having a grounding lug connectable to the head part.

13. The insert of claim 12, wherein the two or more latching connections of the flow aid comprise two or more catches, and wherein the two or more latching connections of the head part comprise two or more latching eyelets complementary to the catches of the flow aid.

14. The insert of claim 12, wherein the head part comprises a filler inlet surrounded by a separating element, and wherein the separating element comprises at least one venting slit and a latching slot configured to seat the flap or a latching fillet.

15. The insert of claim 12, wherein the screw thread includes a lower thread having first and second portions of unequal pitch, and wherein the first and second portions intersect at an obtuse angle, such that a design portion rises upward towards an outer side of the head part.

16. The insert of claim 12, wherein the flow aid is funnel-shaped and comprises a cut-out arranged on its head side, and wherein the cut-out is configured to allow the grounding lug to be led out of the insert.

17. The insert of claim 12, wherein the flap is integrally formed from a closure element, an adjoining spring fillet, and an adjoining grounding lug, and wherein the spring fillet is formed from a plurality of spring portions, and wherein the grounding lug is U-shaped, comprising a curvature formed on a bearing contact leg thereof.

* * * * *